United States Patent [19]
Johnston, Jr.

[11] Patent Number: 5,097,616
[45] Date of Patent: Mar. 24, 1992

[54] APPARATUS FOR COATING FISHING LURE WITH SCENT

[76] Inventor: Clarence P. Johnston, Jr., P.O. Box 578, Pennington Gap, Va. 24277

[21] Appl. No.: 524,722

[22] Filed: May 17, 1990

[51] Int. Cl.⁵ .............................................. A01K 97/06
[52] U.S. Cl. ........................................ 43/4; 220/263; 43/25
[58] Field of Search ........................ 43/4, 25, 54.1; 220/262, 263

[56] References Cited

U.S. PATENT DOCUMENTS

| | | | |
|---|---|---|---|
| 1,053,688 | 2/1913 | Willcox | 220/263 |
| 1,295,517 | 2/1919 | Kaufman | 220/263 |
| 1,881,120 | 10/1932 | Fessler | 220/263 |
| 2,946,474 | 7/1960 | Knapp | 220/263 |
| 4,771,564 | 9/1988 | Whitley | 43/4 |

FOREIGN PATENT DOCUMENTS

167419 8/1921 Canada ............................ 220/263

Primary Examiner—Kurt Rowan
Attorney, Agent, or Firm—Pitts and Brittian

[57] ABSTRACT

A substantially hands-free operated device for coating fishing lures and tackle with a fish attracting scent. A container with a cover which is raised by pressing a foot pedal contains portions of a resilient, absorbent material. The material holds a fish attracting scent absorbed therein, which scent is transferred to fishing tackle placed within the container and the cover closed thereon. A protecting mechanism is provided to prevent the closing of the cover from damaging a fishing line.

2 Claims, 3 Drawing Sheets

APPARATUS FOR COATING FISHING LURE WITH SCENT

TECHNICAL FIELD

This device relates to fishing apparatuses in general, and more particularly concerns a device for applying a fish attracting liquid or scent to fishing lures and other such tackle.

BACKGROUND ART

Devices for adding a fish attracting liquid or scent to fishing lures have been known and used heretofore. In particular, the device of Whitley, U.S. Pat. No. 4,771,564, is known to the inventor of the present invention. However, the device of the present invention differs from all known prior art in construction and operation. Prior art devices, including the device of Whitley, have failed to overcome certain shortcomings, such as the likelihood of contaminating the hands and/or clothing of a user of such device with the fish attracting scent when coating fishing lures with such scent, which shortcomings are overcome by the device of the present invention.

Accordingly, it is a principal object of the present invention to provide a device for coating fishing lures and other tackle with a fish attracting liquid o scent while keeping the fisherman's hands free to manipulate the rod and lure.

It is also an object of the present invention to provide such a device for being operated hands-free by a foot pedal.

It is also an object of the present invention to provide such a device which will protect a fishing line from being damaged by the edges of such a device when the cover thereof is closed around the fishing tackle being treated.

It is a further object of the present invention to provide such a device constructed of a material such as extruded aluminum, for example, in a shape such as a one-piece, bowl-like container, so as to be highly resistant to damage or destruction.

It is still a further object of the present invention to provide such a device with mountings so as to be more or less permanently attached to a larger structure, such as a boat or a dock, for instance.

These and other objects of the present invention will become apparent from the following description taken in connection with the accompanying drawings, in which:

DISCLOSURE OF THE INVENTION

A unitized container having a mating cover is provided. A quantity of resilient, absorbent material is contained within the container and attached to the cover for the purpose of holding a liquid, fish attracting scent therewithin. A foot pedal mechanism operates against a bias to open the cover. A fishing lure on a line can be dropped into the container to rest on a bed of the absorbent material. When the cover is closed over the lure, the two sections of absorbent material are compressed by the lure therebetween, causing the fish attracting liquid to be squeezed out of its state of absorption therein, and to coat the lure. The nature of the scent liquid is to remain on the lure for a period of time, even though immersed in water.

BEST MODE FOR CARRYING OUT THE INVENTION

Figure 1:
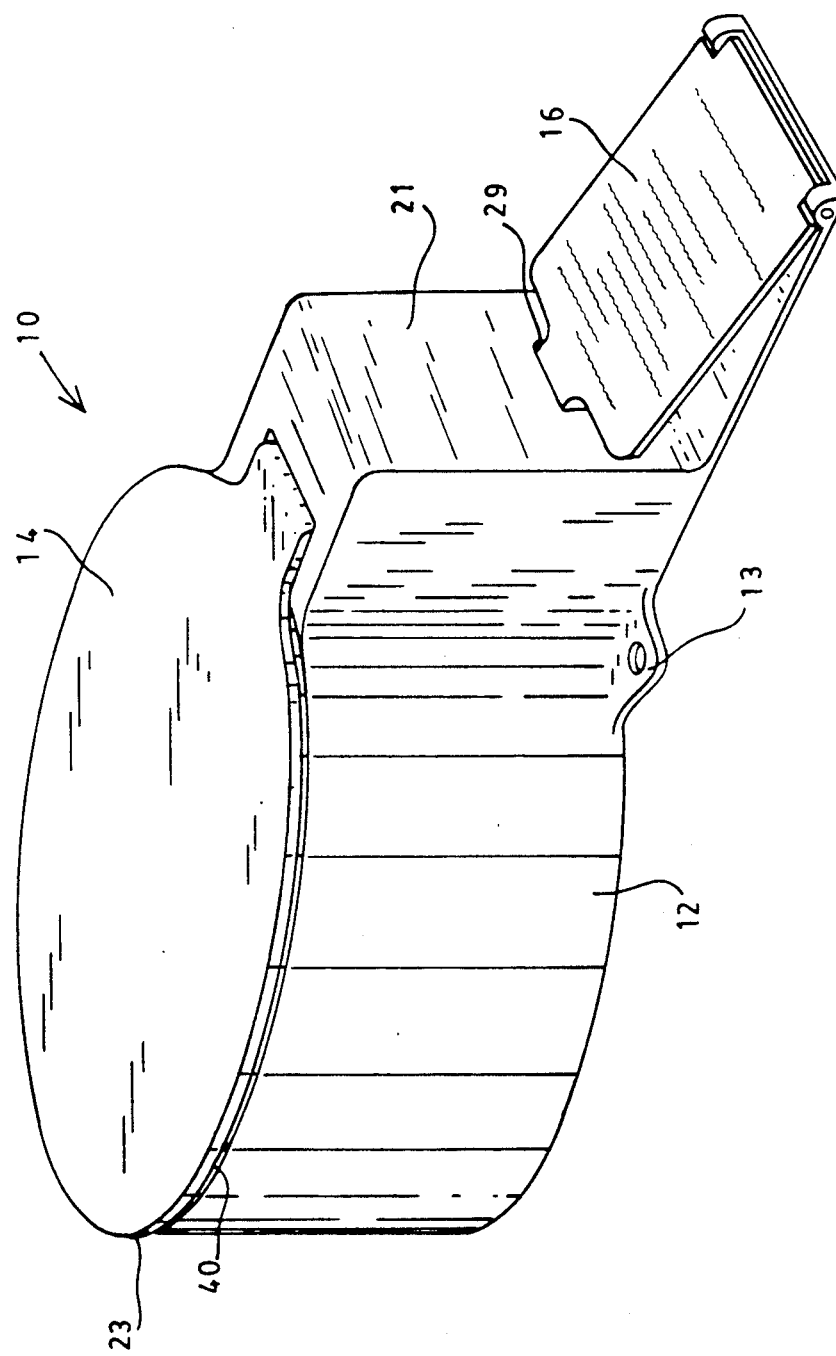
FIG. 1 is a perspective view of a device constructed in accordance with various features of the present invention.

Referring to FIG. 1, a substantially hands-free operated device for coating fishing lures and tackle with a fish attracting scent liquid is designated generally at 10.

A container 12 is preferably formed of a single piece of strong, lightweight, liquid impervious material, such as extruded plastic, for example, having a substantially bowl-shaped interior. The container defines a containment chamber for holding the scent liquid to be applied to the lure In a preferred embodiment, mounting ears 13 are provided as an integral part of container 12 for mounting to a structure such as a boat deck or a dock, for instance. A portion of the exterior of container 12 can be extended rearwardly in such a manner as to form an enclosed chamber 15 for housing a mechanical linkage arrangement and having a slotted opening 29 in a wall 21 distal from the interior bowl portion of container 12.

Also in a preferred embodiment, container 12 can be capped with a cover 14 which is biased in the normally closed position. Cover 14 is preferably constructed so as to be of substantial weight, such as two pounds, for example. This weight assists in forming an integral bias of cover 14 to the closed position. Cover 14 can have a lip member 23 which is in register with the exterior surface 25 of container 12, and an interior surface 34 of cover 14 which is in register with the interior surface 27 of container 12, thus forming a tight fit of cover 14 to container 12.

A portion of cover 14 can be formed so as to end in a linkage 26 which is inserted into chamber 15 and pivotally attached to a pair of link rods 20 portion of linkage arrangement 11. Link rods 20, in turn, are pivotally attached to connecting arm 19 which passes through slotted opening 29 in wall 21. Connecting arm 19 is an extension of a foot pedal 16 and connects foot pedal 16 to link rods 20.

Figure 3:
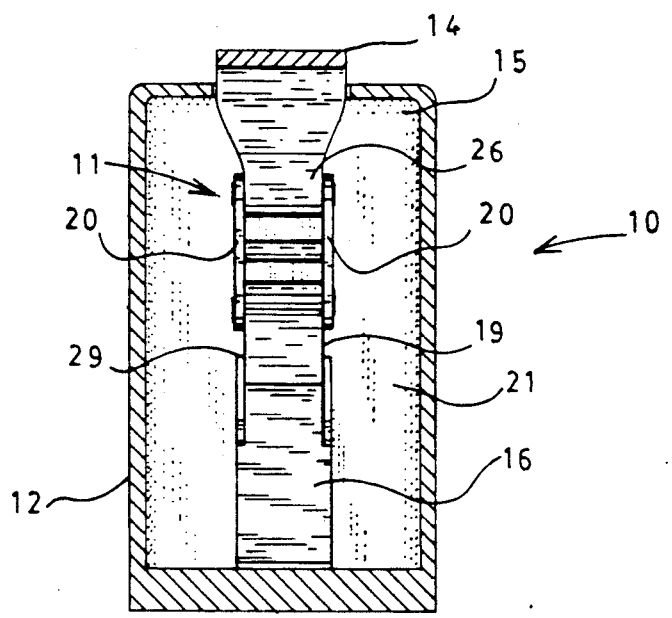
FIG. 3 is a view of section 3—3 of FIG. 2.

Foot pedal 16 can be pressed in the direction of arrow 18 to open cover 14. When foot pedal 16 is caused to move in the direction of arrow 18, connecting arm 19 pulls down on link rod 20 in the direction of arrow 24, causing link rod 20 to pull linkage end 26 in the direction of arrow 28, causing cover 14 to move upwardly from the body of container 12. As cover 14 moves upwardly from container 12, cover arm member 25 contacts lip 22 to prevent any further upward travel of cover 14. This assists in biasing cover 14 in the closed position. When foot pedal 16 is released, it will return to its original position, and the weight of cover 14 will return it to the closed position. The view of FIG. 3 more clearly illustrates the placement and action of double link rods 20 in opening the cover 14.

One portion 30 of a resilient, absorbent material, such as an open cell polyurethane, for example, is enclosed in container 12 in the containment chamber, and another portion 32 of such a resilient, absorbent material is attached to an inside surface 34 of cover 14.

Figure 2:
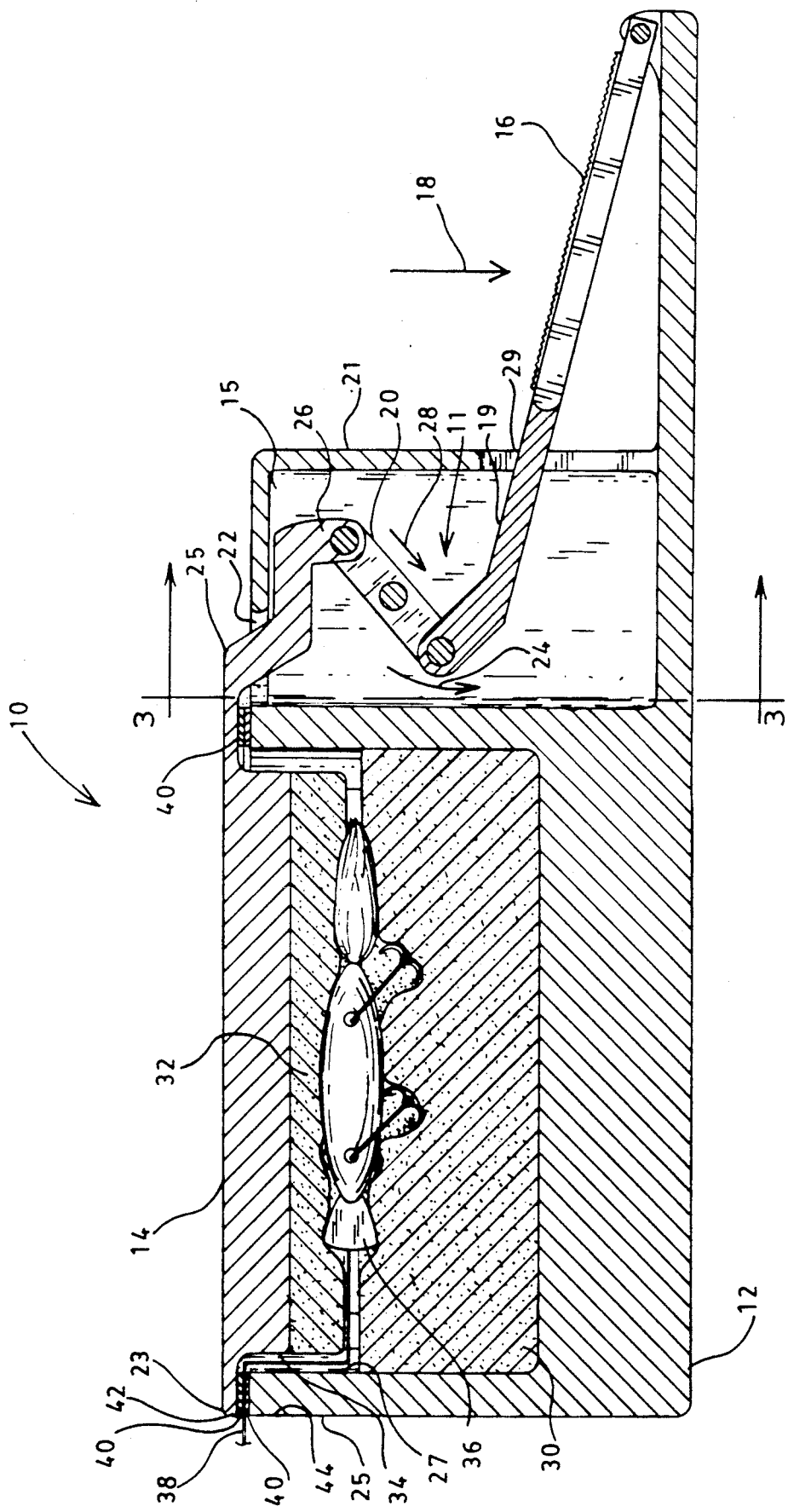
FIG. 2 is a side view in section of the device of FIG. 1, showing a fishing lure disposed therein.

As seen in FIG. 2, when a fishing lure 36 is placed on a portion 30 of absorbent material within the containment chamber and cover 14 is closed thereupon, a liquid fish attracting scent (not shown), which has been held in absorption by absorbent material portions 30 and 32, is squeezed out of its state of absorption and onto lure 36. Of course, it will be seen by those with expertise in the art that additional quantities of fish scent can be poured onto material portions 30 and 32 as necessary for replenishment.

Lure 36 can be attached to a fishing line 38, in readiness for fishing and for contamination-free depositing of lure 36 into container 12. When cover 14 is closed on container 12, line protector 40 prevents line 38 from receiving compression or cutting damage by edges 42 and 44. Cover protector 40 can be additional portions of a polyurethane foam material as in 30 and 32, attached to lip 23. By having lure 36 attached to a line and by using foot pedal 16 to open the cover 14 of container 12, a virtually hands-free operation has been accomplished, avoiding the contaminating of the user's hands or clothing by the scent.

Thus, it will be seen that there has been provided a description of an improved device for applying a fish attracting scent to fishing lures and other such tackle.

The lure scent application device of the present invention is designed to scent a lure faster and to provide more complete saturation of the lure with the scented liquid. The device is designed such that it can be foot operated such that the hands or boat are not contaminated and that dripping is kept to a minimum. The device can be utilized without bending over, and can be used from either a standing or a sitting position. Moreover, it can be readily used by a handicapped person. With the lid closed, evaporation is prevented, and application of the scented liquid to the lure is not affected by wind, rain or sunlight. Further, the device is designed such that it is sturdy and heavy enough such that it will not bounce around in the boat even when it is not secured thereto. As necessary or desired, it can be secured in one location with screws as described above.

While a preferred embodiment of a device constructed in accordance with various features of the present invention has been described herein, no attempt has been made to limit the device to such description. Rather, such description has been intended to embody all possible variations and alternate constructions falling within the spirit and scope of the invention as defined in the appended claims.

Accordingly, this invention is limited only by the claims appended hereto, and their equivalents, when taken in combination with the complete description contained herein.

I claim:

1. A fishing lure scent application device for applying a fish-attracting scented liquid to a fishing lure, said device comprising:

a container defining a chamber therein and including sidewalls having an upper edge portion defining an opening for accessing said chamber;

a cover member for selectively covering said opening accessing said chamber, said cover member being selectively pivotable from a closed position covering said opening to an open position permitting access to said chamber whereby said fishing lure can be inserted into and removed from said chamber, said cover member being biased in a closed position, said cover member defining an outer perimeter portion for engaging said edge portion of said container, and being provided with a linkage engaging member extending outwardly from said outer perimeter portion;

a foot pedal actuated mechanism for selectively moving said cover member from said closed position to said open position, said mechanism including a foot pedal pivotally secured at a first end portion to said container, and including a linkage means pivotally secured to a second end portion of said foot pedal and pivotally secured to said linkage engaging member of said cover member, whereby the selective depression of said foot pedal pivots said second end portion of said foot pedal downwardly, carrying said linkage means downardly and pivoting said cover member to said open position;

a first resilient, absorbent applicator member disposed within said chamber of said container for receiving said scented liquid and for applying said scented liquid to said fishing lure as said fishing lure is received in said chamber of said container;

a second resilient, absorbent applicator member secured to the lower surface of said cover member for receiving said scented liquid and for applying said scented liquid to said fishing lure as said fishing lure is received in said chamber of said container and said cover member is placed in said closed position; and fishing line protection means for protecting fishing line from being damaged as said fishing line is positioned between said edge portion of said container and said outer perimeter portion of said cover member as said cover member is in said closed position, said fishing line protection means including a first resilient lining on said edge portion of said container and a second resilient liner covering the lower surface of said outer perimeter portion of said cover member.

2. A fishing lure scent application device for applying a fish-attracting scented liquid to a fishing lure, said device comprising:

a container defining a chamber therein and including sidewalls having an upper edge portion defining an opening for accessing said chamber, said container provided with means for attaching said container to a mounting surface;

a cover member for selectively covering said opening accessing said chamber, said cover member having a lower surface toward said chamber and being selectively pivotable from a closed position covering said opening to an open position permitting access to said chamber whereby said fishing lure can be inserted into and removed from said chamber, said cover member being biased in a closed position, said cover member defining an outer perimeter portion for engaging said edge portion of said container, and being provided with a linkage engaging member extending outwardly from said outer perimeter portion;

a foot pedal actuated mechanism for selectively moving said cover member from said closed position to said open position, said mechanism including a foot pedal pivotally secured at a first end portion to said container, and including a linkage means pivotally secured to a second end portion of said foot pedal and pivotally secured to said linkage engaging member of said cover member, said linkage means and said linkage engaging member of said cover member being enclosed by a portion of said container, whereby selective depression of said foot pedal pivots said second end portion of said food pedal downwardly, carrying said linkage means downwardly and pivoting said cover member to said open position;

a first resilient absorbent applicator member disposed within said chamber of said container for receiving said scented liquid and for applying said scented liquid to said fishing lure as said fishing lure is received in said chamber of said container;

a second resilient, absorbent applicator member secured to said lower surface of said cover member for receiving said scented liquid and for applying said scented liquid to said fishing lure as said fishing lure is received in said chamber of said container and said cover member is placed in said closed position; and a fishing line protection means for protecting fishing line from being damaged as said fishing line is positioned between said edge portion of said container and said outer perimeter portion of said cover member as said cover member is in said closed position, said fishing line protection means including a first resilient lining on said edge portion of said container and a second resilient liner covering the lower surface of said outer perimeter portion of said cover member for cooperation with said first resilient lining.

* * * * *